(12) United States Patent
Marchesotti et al.

(10) Patent No.: US 8,369,616 B2
(45) Date of Patent: Feb. 5, 2013

(54) CHROMATIC MATCHING GAME

(75) Inventors: Luca Marchesotti, Grenoble (FR); Ana Fucs, Rio de Janeiro (BR)

(73) Assignee: Xerox Corporation, Norwalk, CT (US)

( * ) Notice: Subject to any disclaimer, the term of this patent is extended or adjusted under 35 U.S.C. 154(b) by 225 days.

(21) Appl. No.: 12/908,410

(22) Filed: Oct. 20, 2010

(65) Prior Publication Data

US 2012/0099784 A1 Apr. 26, 2012

(51) Int. Cl.
*G06K 9/00* (2006.01)
*G06K 9/60* (2006.01)

(52) U.S. Cl. ........................ 382/162; 382/305

(58) Field of Classification Search ........................ None
See application file for complete search history.

(56) References Cited

U.S. PATENT DOCUMENTS

| | | | |
|---|---|---|---|
| 5,642,137 A | 6/1997 | Kitazumi | |
| 6,702,288 B1 | 3/2004 | Ohman | |
| 7,313,276 B2 | 12/2007 | Simelius et al. | |
| 2003/0012428 A1 | 1/2003 | Syeda-Mahmood | |
| 2003/0021481 A1 | 1/2003 | Kasutani | |
| 2003/0146925 A1* | 8/2003 | Zhao et al. | 345/700 |
| 2004/0164991 A1 | 8/2004 | Rose | |
| 2006/0066629 A1 | 3/2006 | Norlander et al. | |
| 2006/0164664 A1 | 7/2006 | Lee | |
| 2007/0005356 A1 | 1/2007 | Perronnin | |
| 2007/0258648 A1 | 11/2007 | Perronnin | |
| 2008/0046410 A1* | 2/2008 | Lieb | 707/3 |
| 2008/0069456 A1 | 3/2008 | Perronnin | |
| 2008/0240572 A1 | 10/2008 | Hoshii | |
| 2008/0317358 A1 | 12/2008 | Bressan et al. | |
| 2009/0144033 A1 | 6/2009 | Perronnim | |
| 2009/0231355 A1 | 9/2009 | Perronnin | |
| 2009/0265383 A1 | 10/2009 | Sanyal et al. | |
| 2010/0040285 A1 | 2/2010 | Csurka et al. | |
| 2010/0092084 A1 | 4/2010 | Perronnin et al. | |
| 2010/0098343 A1 | 4/2010 | Perronnin et al. | |

OTHER PUBLICATIONS

Rubner, Tomasi Yossi , Carlo, and Leonidas J. Guibas. "The Earth Mover's Distance as a Metric for Image Retrieval." SpringerLink. Springer Science Business Media, Jan. 20, 2000. Web. Jul. 16, 2012. <http://www.springerlink.com/content/w5515k817681125h/export-citation/>.vol. 40 Issue: 2.*

Cox, Ingemar J., Matt L. Miller, Stephen M. Omohundro, and Peter N. Yianilos. "PicHunter: Bayesian Relevance Feedback for Image Retrieval." IEEE Xplore. N.p., Aug. 25-29, 1996. Web. Jul. 16, 2012. <http://ieeexplore.ieee.org/xpls/abs_all.jsp?arnumber=546971>.*

(Continued)

*Primary Examiner* — Stephen R Koziol
*Assistant Examiner* — Amandeep Saini
(74) *Attorney, Agent, or Firm* — Fay Sharpe LLP (57) ABSTRACT

A system and method for image retrieval formulated as a game are disclosed. The method includes receiving a user's image category selection, retrieving an image responsive to the user's image category selection from an associated image database, and displaying the retrieved image and a set of candidate color palettes to the user. The set of candidate color palettes includes a correct palette and at least one incorrect palette. The method further includes providing for a user to attempt to identify the correct palette by selecting at least one of the displayed candidate color palettes and, with a computer processor, generating a score based on the user's at least one selection and outputting the score.

26 Claims, 4 Drawing Sheets

OTHER PUBLICATIONS

Lee, C.W., Huang, J.K., Chou, W.S., Sun, H.H., Yeh, T.Y., Huang, M.J. & Chen, H.C. (2008). Development of a Geometry Learning Game with Tangible User Interfaces. In J. Luca & E. Weippl (Eds.), Proceedings of World Conference on Educational Multimedia, Hypermedia and Telecommunications 2008 (pp. 1548-1553). Chesapeake, VA: AACE.*

Robotka, Zs. and Zempleni, A.: Image Retrieval using Gaussian Mixture Models, Annales Universitatis Scientiarum de Rolando Eotvos Nominatae, Sectio Computatorica, Budapest, 31, 93-105, 2009.*

Sheth, Jagdish N., and Rajendra Sisodia. Does Marketing Need Reform?: Fresh Perspectives on the Future. Armonk, NY: M.E. Sharpe, 2006. Print.*

U.S. Appl. No. 12/890,049, filed Sep. 24, 2010, Skaff, et al.

Datta, et al. "Image retrieval: Ideas, influences, and trends of the new age," *ACM Comput. Surv.* 40:2, 1-60 (Apr. 2008).

von Ahn, et al. "Labeling images with a computer game," in *Proc. SIGCHI Conf. on Human Factors in Computing Systems* (Vienna, Austria, Apr. 24-29, 2004), CHI '04, ACM, New York, NY, 319-326.

von Ahn, et al. "Peekaboom: a game for locating objects in images," in *Proc. SIGCHI Conf. on Human Factors in Computing Systems* (Montreal, Quebec, Canada, Apr. 22-27, 2006) (Grinter, et al., Eds. CHI '06. ACM, New York, NY, 55-64).

Perronnin, et al., "Fisher Kernels on Visual Vocabularies for Image Categorization," in *Proc. of the IEEE Conf on Computer Vision and Pattern Recognition* (CVPR), Minneapolis, MN, USA (Jun. 2007).

Zheng, et al. "Tour the World: Building a web-scale landmark recognition engine," IEEE Computer Society Conference, 2009.

Jegou, et al. "Improving Bag-Of-Features for Large Scale Image Search," in IJCV, 2010.

Orchard, et al. "Color quantization of images," IEEE Transactions on Signal Processing 39, pp. 2677-2690 (1991).

Rubner, et al. "A Metric for Distributions with Applications to Image Databases," in *Proc. 1998 IEEE Intern'l Conf. on Computer Vision*, Bombay, India, Jan. 1998, pp. 59-66.

von Ahn, et al. "Designing games with a purpose," *Commun. ACM* 51, 8 (Aug. 2008), 58-67.

Colombino, Deliverable D7.1, Report on user requirement findings, part I, FP7-216529, Oct. 30, 2009.

"Flow (psychology)" en.wikipedia.org/wiki/Flow_(psychology) (Csíkszentmihályi, M.)—accessed Sep. 9, 2010.

Rui, et al. "Relevance Feedback: A Power Tool for Interactive Content-Based Image Retrieval," IEEE Transactions on Circuits and Systems, 1998.

Westerman, et al. "Supporting creative product/commercial design with computer-based image retrieval," in *Proceedings of the 14th European Conference on Cognitive Ergonomics: invent! Explore!* (London, United Kingdom, Aug. 28-31, 2007). ECCE '07, vol. 250. ACM, New York, NY, 75-81—Abstract Only.

Deng, et al. "An Efficient Color Representation for Image Retrieval," IEEE Transactions on Image Processing, vol. 10, No. 1, Jan. 2001.

U.S. Appl. No. 12/693,795, filed Jan. 26, 2010, Skaff, et al.
U.S. Appl. No. 12/624,960, filed Nov. 24, 2009, Perronnin, et al.
U.S. Appl. No. 12/372,063, filed Feb. 17, 2009, Csurka, et al.
U.S. Appl. No. 12/632,107, filed Dec. 7, 2009, Marchesotti, et al.
U.S. Appl. No. 12/512,209, filed Jul. 30, 2009, Perronnin, et al.

* cited by examiner

CHROMATIC MATCHING GAME

CROSS REFERENCE TO RELATED PATENTS AND APPLICATIONS

Cross reference is made to the following co-pending applications, the disclosures of which are incorporated herein in their entireties, by reference:

U.S. patent application Ser. No. 12/693,795, filed on Jan. 26, 2010, entitled A SYSTEM FOR CREATIVE IMAGE NAVIGATION AND EXPLORATION, by Sandra Skaff, et al.

U.S. patent application Ser. No.12/624,960, filed Nov. 24, 2009, entitled DIALOG SYSTEM FOR COMPREHENSION EVALUATION, by Florent Perronnin, et al.

U.S. patent application Ser. No. 12/372,063, filed Feb. 17, 2009, entitled MODIFICATION OF IMAGES FROM A USER'S ALBUM FOR SPOT-THE-DIFFERENCES, by Gabriela Csurka, et al.

U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

BACKGROUND

The exemplary embodiment relates to digital image collections. It finds particular application in connection with a system and method for playing a game in which color palettes are matched to photographic images, which can assist a user in making digital image or color palette selections.

Photographic images are often collected and stored in large databases with tags which describe their semantic content, such as "sky," or "flower," or their aesthetic features, such as "happy," "funny," and the like. Such databases are accessed by a variety of users searching for suitable images to meet a particular need. The typical user of an image retrieval system has been characterized as falling into one of three profiles: a "browser" is a user with no clear end-goal, who often jumps from one topic to another; a "surfer" is a user with an initial exploratory behavior that clarifies his or her goals through multiple queries; and a "searcher" is a user with very clear goal-regarding semantic and aesthetic features of the image for which he or she is looking. See Datta, R., Joshi, D., Li, J., and Wang, J. Z; "Image retrieval: Ideas, influences, and trends of the new age," *ACM Comput. Surv.* 40:2, 1-60 (April 2008) (hereinafter "Datta 2008"). Recent studies performed among graphic designers and photo editors show that such users, in most cases, would fall into one of the latter two profiles. It has also been observed that the activity of browsing through a large collection of images is often used to define and refine the criteria of the search itself.

Although image retrieval systems are often equipped with tools to support searchers in their targeted retrieval workflows, less attention is dedicated to develop methods for exploratory image search performed by both browsers and searchers. While some systems are specifically designed for this kind of user experience, they are based on random slideshows. Relevance-feedback systems could be considered for this kind of search. However, the level of user engagement in the search tends to be very limited and the act of constantly providing feedback can prove tedious for users.

Researchers in the field of psychology have shown that games can elicit mental states which are especially favorable to creation and learning activities. See Snyder, C. R. & Lopez, S. J, *Positive psychology: The scientific and practical explorations of human strengths*, London, UK: Sage Publications (2007). Games have been used to address computer vision problems. See, for example, von Ahn, L., and Dabbish, L., "Labeling images with a computer game," in *Proc. SIGCHI Conf. on Human Factors in Computing Systems* (Vienna, Austria, Apr. 24-29, 2004), CHI '04, ACM, New York, N.Y., 319-326, which uses an interactive system for image segmentation. Other games, such as Peekaboom, ESP, and Google Image Labeler have proved useful in the generation of costly ground truth for machine learning and pattern recognition experiments (see, e.g., von Ahn, L., Liu, R., and Blum, M., "Peekaboom: a game for locating objects in images," in *Proc. SIGCHI Conf. on Human Factors in Computing Systems* (Montreal, Quebec, Canada, April 22-27, 2006). R. Grinter, et al., Eds. CHI '06. ACM, New York, N.Y., 55-64). The underlying assumption is that humans require some incentive to become part of a collective task. More recent approaches also leverage outsourcing services, such as Mechanical Turks to perform such tasks.

The exemplary embodiment provides a system and method which assists users, such as graphic designers, who are commonly searching for images to be used within their creative workflows. By using the game dimension to engage the user in non targeted image searches, the beneficial effects of a game upon the creative process can be realized.

INCORPORATION BY REFERENCE

The following references, the disclosures of which are incorporated herein by reference in their entireties, are mentioned:

The following references relate generally to visual classification and image retrieval methods: U.S. Pub. No. 20070005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20080317358, published Dec. 25, 2008, entitled CLASS-BASED IMAGE ENHANCEMENT SYSTEM, by Marco Bressan, et al.; U.S. Pub. No. 20090144033, published Jun. 4, 2009, entitled OBJECT COMPARISON, RETRIEVAL, AND CATEGORIZATION METHODS AND APPARATUSES, by Florent Perronnin, et al.; U.S. Pub. No. 20100040285, published Feb. 18, 2010, entitled SYSTEM AND METHOD FOR OBJECT CLASS LOCALIZATION AND SEMANTIC CLASS BASED IMAGE SEGMENTATION, by Gabriela Csurka, et al.; U.S. Pub. No. 20100092084, published Apr. 15, 2010, entitled REPRESENTING DOCUMENTS WITH RUN-LENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20030021481, published Jan. 30, 2003, entitled IMAGE RETRIEVAL APPARATUS AND IMAGE RETRIEVING METHOD, by E. Kasutani; U.S. Pub. No. 20080240572, published Oct. 2, 2008, entitled IMAGE SEARCH APPARATUS AND IMAGE SEARCH METHOD, by J. Hoshii; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin, et al.; above-mentioned U.S. patent application Ser. No. 12/693,795; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Nerve Jegou, Matthijs Douze, and Cordelia Schmid, "Improving Bag-Of-Features for Large Scale Image Search," in IJCV, 2010.

The following references relate generally to games: U.S. Pub. No. 20090265383, published Oct. 22, 2009, entitled SYSTEM AND METHOD FOR PROVIDING IMAGE LABELING GAME USING CBIR, by Subhajit Sanyal, et al.; U.S. Pat. No. 6,702,288, issued Mar. 9, 2004, entitled COLOR GAME, by Frances M. Ohman; U.S. Pat. No. 7,313,276, published Dec. 25, 2007, entitled METHOD AND DEVICE FOR OPERATING AN ELECTRONIC COMMUNICATION NETWORK GAME, by Kim Simelius, et al.; and above-mentioned U.S. patent application Ser. No. 12/372,063.

Color palettes are disclosed in U.S. Pub No. 20090231355, published Sep. 17, 2009, entitled COLOR TRANSFER BETWEEN IMAGES THROUGH COLOR PALETTE ADAPTATION, by Florent Perronnin; U.S. Pub No. 20030146925, published Aug. 7, 2003, entitled GENERATING AND USING A COLOR PALETTE, by Jun Zhao, et al.; U.S. Pub. No. 20060066629, published Mar. 30, 2006, entitled SYSTEM AND METHOD FOR COLOR SELECTION, by Rebecca Norlander, et al.; U.S. Pat. No. 5,642,137, issued Jun. 24, 1997, entitled COLOR SELECTING METHOD, by Kitazumi; and U.S. Pub. No 20040164991, published Aug. 26, 2004, entitled COLOR PALETTE PROVIDING CROSS-PLATFORM CONSISTENCY, by Brian Rose.

The following relate generally to extraction of colors from images or image querying based on color: U.S. Pub. No. 20080046410, published Feb. 21, 2008, entitled COLOR INDEXING AND SEARCHING FOR IMAGES, by Adam Lieb; U.S. Pub. No. 20030012428, published Jan. 16, 2003, entitled METHOD AND APPARATUS FOR INDEXING AND RETRIEVING IMAGES FROM AN IMAGE DATABASE BASED ON A COLOR QUERY, by T. F. Syeda-Mahmood; and U.S. Pub. No. 20060164664, published Jul. 27, 2006, entitled COLOR QUANTIZATION AND METHOD THEREOF AND SEARCHING METHOD USING THE SAME, by J. S. Lee.

BRIEF DESCRIPTION

In accordance with one aspect of the exemplary embodiment, a method for image retrieval formulated as a game is provided. The method includes receiving a user's image category selection, retrieving an image responsive to the user's image category selection from an associated image database, and providing for displaying the retrieved image, together with a set of candidate color palettes, to the user. The set of candidate color palettes includes a first color palette designed as a correct palette and at least one second palette designed as an incorrect palette. The method further includes providing for a user to attempt to identify the correct palette by selecting at least one of the displayed candidate color palettes. A score is generated, based on the user's at least one selection and outputted. All or part of the method may be computer implemented.

In another aspect, a system for image retrieval formulated as a game includes an image retrieval component for retrieving an image from an associated image database, a palette extractor which extracts a color palette from the retrieved image, a candidate palette retrieval component for retrieving predefined color palettes from an associated color palette database based on the extracted color palette, and a visualization component for visualizing a set of candidate color palettes for display on a user's graphical user interface in association with the retrieved image. The set of candidate color palettes includes at least one of the extracted color palette and the retrieved predefined color palettes. A scoring component scores a user's selection of at least one of the displayed set of candidate color palettes, whereby a score is displayable on the user's graphical user interface. A processor of the system implements the image retrieval component, the palette extractor, the candidate palette retrieval component, the visualization component, and the scoring component.

In another aspect, a method includes retrieving an image from an image database. A color palette is extracted from the retrieved image. Predefined color palettes are retrieved from a color palette database, based on the extracted color palette. A set of candidate color palettes is visualized for display on a user's graphical user interface in association with the retrieved image, the set of candidate color palettes including at least one of the extracted color palette and the retrieved predefined color palettes. A user's selection of at least one of the displayed set of candidate color palettes is scored, whereby a score is displayable on the user's graphical user interface. The method further includes providing for the user to bookmark at least one of the displayed image and one of the candidate color palettes in the set of color palettes. The retrieval of the image is based on at least one of an image category selected by the user, a different image bookmarked in a prior round in which the different image and an associated set of candidate color palettes was displayed to the user, and a color palette bookmarked in the prior round.

DETAILED DESCRIPTION

Aspects of the exemplary embodiment relate to a system and method for exploratory image retrieval based on a chromatic matching game ("Chromatch"). In one embodiment, a user is engaged in a game where he or she is able to browse, analyze, and select images and colors in a large database of creative assets (generally digital images, e.g., photographs). An exploratory image and/or color search is thus reformulated as an interactive game. The game reduces the tedium of exploration while providing information for focusing the user's exploratory search. This approach can provide other advantages related to a web-based game, such as clustering multiple users sharing the same search criteria and increasing user loyalty to a particular web-based provider, e.g., by converting points acquired in playing the game to vouchers for the provider's services, such as printing images on web-to-print devices, and the like.

The exemplary system may be integrated on the top of an existing image retrieval system, in particular, one which is capable of searching for images based on visual similarity. The system and method are particularly applicable to the graphic design field, but can also be employed for education and learning purposes, for example, to teach players basic principles of visual aesthetics. In addition, the game can also be useful to generate ground truth data for testing color scheme similarity measures.

The game can be configured in different modalities involving single or multiple players that can compete among themselves or against the computer. Various degrees of difficulty can also be made available to make the game challenging for different categories of users.

In various aspects disclosed herein, the game includes associating an image with one or multiple colors (color palettes). The association may be according to one of a set of specific matching criteria (e.g., color palette similarity, color harmony, dominant color, and the like).

A "color palette," as used herein, is a limited set of different colors, which may be displayed as an ordered or unordered sequence of swatches, one for each color in the set. The colors in a "predefined color palette" may have been selected by a graphic designer, or other skilled artisan working with color, to harmonize with each other, when used in various combinations. The effect of different predefined color palettes on the human perception of the objects to which the colors are applied, such as brochures, textiles, automobiles, and the like, is not fully understood. However, either through common usage or innate preferences, the selection of a predefined color palette can influence a customer's perception of an object. In the exemplary embodiment, a set of predefined color palettes is provided from which a small subset can be drawn which have colors that match (similarity or harmonization) the colors of a digital image. In the exemplary embodiment, each predefined color palette may have the same number (or different numbers) of visually distinguishable colors. In general, the predefined color palettes each include at least two colors, such as at least four colors, e.g., up to ten colors, such as four, five, or six different colors.

An "extracted color palette" refers to a color palette which has been extracted from a digital image, based on the colors present in the digital image. In the exemplary embodiment, each extracted color palette has the same number of colors. For example, the extracted color palette may have at least four and, in one embodiment, no more than ten colors. The extracted colors palette may have the same number of color swatches as the predefined color palettes, or may have a different number of colors to at least some of the predefined color palettes. As will be appreciated, a digital photographic image typically has far more than five or ten different colors and the extracted color palette includes many fewer colors than the digital image from which it is extracted. The exemplary method also contemplates the use of "noise palettes," which are color palettes that each include a set of colors, as for the extracted and predefined color patches, and which may be generated automatically, as described in further detail below.

A "user" (or player) can be any person or persons having access to a database of digital images, such as a graphic designer who is searching for an appropriate photograph to complement the remainder of a digital document, or one who is searching for both an image and a color palette which matches the image. In searching for a suitable image, the designer may be assessing not only the semantic content of the images viewed, but also their predominant colors.

The term "color" is used to refer to any aspect of color which may be specified, including, but not limited to, absolute color values, such as hue, chroma, and lightness, and relative color values, such as differences in hue, chroma, and lightness. Color can be expressed, for example, in a three, or more coordinate color space, such as RGB, L*, a*, b*, YCbCr, Luv, XYZ, CMYK, etc. Color, as used herein, is not limited to chromatic colors but also includes black and white.

A "digital image" (or simply "image") can be any convenient file format, such as JPEG, Graphics Interchange Format (GIF), JBIG, Windows Bitmap Format (BMP), Tagged Image File Format (TIFF), JPEG File Interchange Format (JFIF), Delrin Winfax, PCX, Portable Network Graphics (PNG), DCX, G3, G4, G3 2D, Computer Aided Acquisition and Logistics Support Raster Format (CALS), Electronic Arts Interchange File Format (IFF), IOCA, PCD, IGF, ICO, Mixed Object Document Content Architecture (MO:DCA), Windows Metafile Format (WMF), ATT, (BMP), BRK, CLP, LV, GX2, IMG(GEM), IMG(Xerox), IMT, KFX, FLE, MAC, MSP, NCR, Portable Bitmap (PBM). Portable Greymap (PGM), SUN, PNM, Portable Pixmap (PPM), Adobe Photoshop (PSD), Sun Rasterfile (RAS), SGI, X BitMap (XBM), X PixMap (XPM), X Window Dump (XWD), AFX, Imara, Exif, WordPerfect Graphics Metafile (WPG), Macintosh Picture (PICT), Encapsulated PostScript (EPS), or other common file format used for images and which may optionally be converted to another suitable format prior to processing. Digital images may be individual photographs or video images. In general, each input digital image includes image data for an array of pixels forming the image. The image data may include colorant values, such as grayscale values, for each of a set of at least three color separations, such as RGB, or be expressed in another other color space in which different colors can be represented. In general, "grayscale" refers to the optical density value of any single color channel, however expressed (RGB, YCbCr, L*a*b*, etc.). The exemplary embodiment is not intended for black and white (monochrome) images, although it could be modified to allow incorporation of such images. In displaying an image, a reduced pixel resolution version ("thumbnail") of a stored digital image may be used, which is considered to be displaying the image.

The exemplary digital images are tagged with natural language tags, which generally refer to the semantic content of the respective image. By semantic content, it is meant the visually perceptible content of the image, which may be manually assigned or automatically extracted.

In the exemplary computer implemented game, a player selects a theme of interest (e.g., the category "sky") and optionally a desired challenge (e.g., color similarity or harmony) and/or level of difficulty. The system returns an image with a compliant semantic content (e.g., based on its tag(s)) as well as a sequence of candidate color palettes which may be considered as near duplicates. The player has to guess which color palette contains the dominant colors of the image (or harmonious colors, in the case of harmony).

Figure 1:
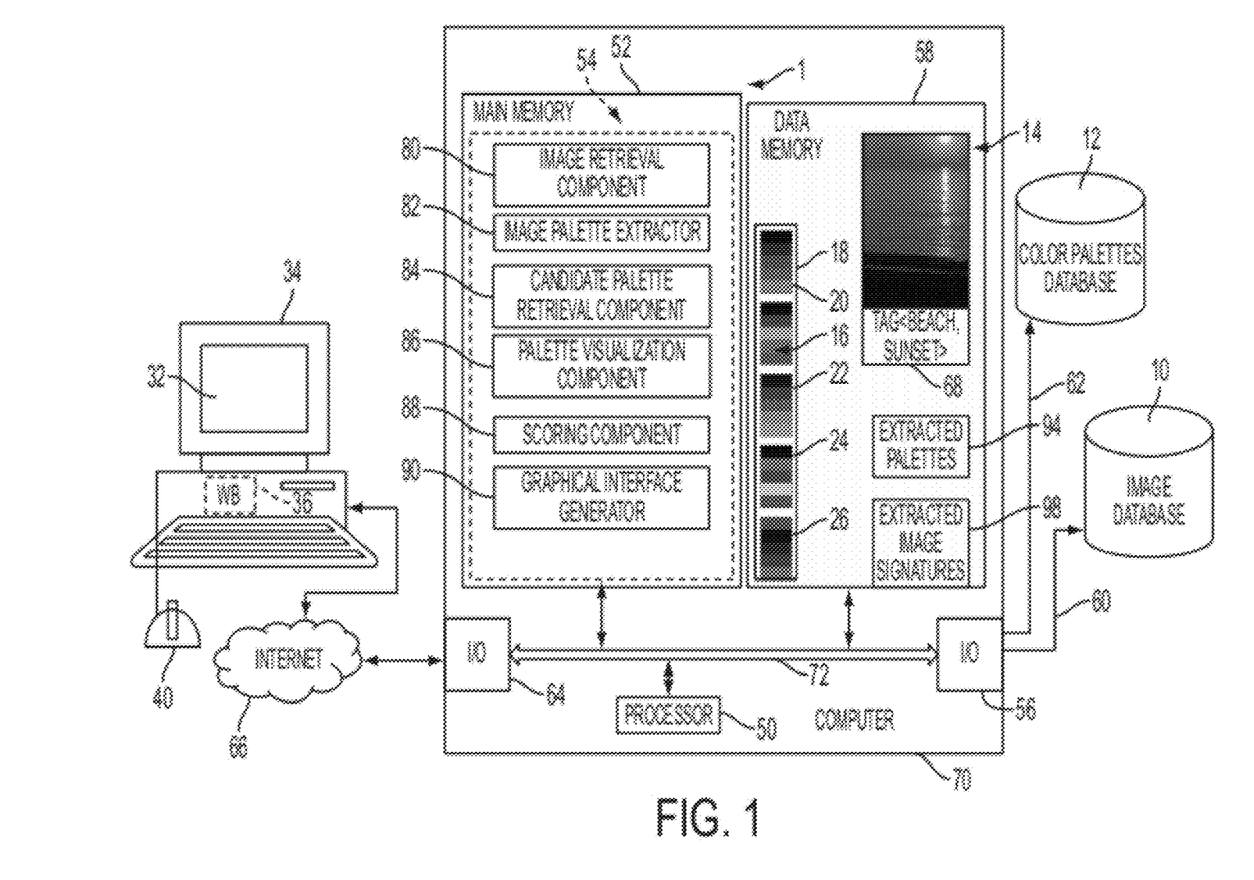
FIG. 1 is a functional bock diagram of an environment in which a system for providing a chromatic matching game operates.

As illustrated in FIG. 1, the game can be implemented using a computer system 1 that is communicatively linked to an annotated database 10 of digital images and to a database 12 of predefined color palettes. For an image 14 drawn from the database 10 at random or based on an existing template, the colors of the image can be modeled by the system 1 using a Gaussian mixture model (GMM). The exemplary GMM is composed of n Gaussians to provide an extracted image color palette 16, where n is the number of colors in the extracted image color palette 16 (5 in the exemplary embodiment). A set 18 of candidate color palettes 16, 20, 22, 24, 26 (five in the exemplary embodiment) is selected for presentation to the user together with the image 14. For a game based on similarity, the exemplary set 18 includes the image color palette 16 and one or more, e.g., four predefined color palettes 20, 22, 24, 26 which are similar, but not identical, to the extracted color palette 16. These similar palettes can be identified in the palette database 12, e.g., through computing an edit distance, such as the Earth Mover's Distance (EMD) between the extracted palette and palettes in the database, as described below. While four of the candidate color palettes selected by this method are shown in the illustrated embodiment, any number of color palettes may be selected by this method, such as a total of two, three, four, five, six, ten, or more color palettes (with fewer than all the color palettes in the database 12 being selected). In one embodiment, the number of candidate color palettes may increase as the level of difficulty of the game increases.

As will be appreciated, while for illustrative purposes, the retrieved predefined color palettes 20, 22, 24, 26 and extracted color palette 16 are each shown as a row of five swatches, the color palettes may be stored in the database 12 as numerical color values, or the like.

Figure 2:
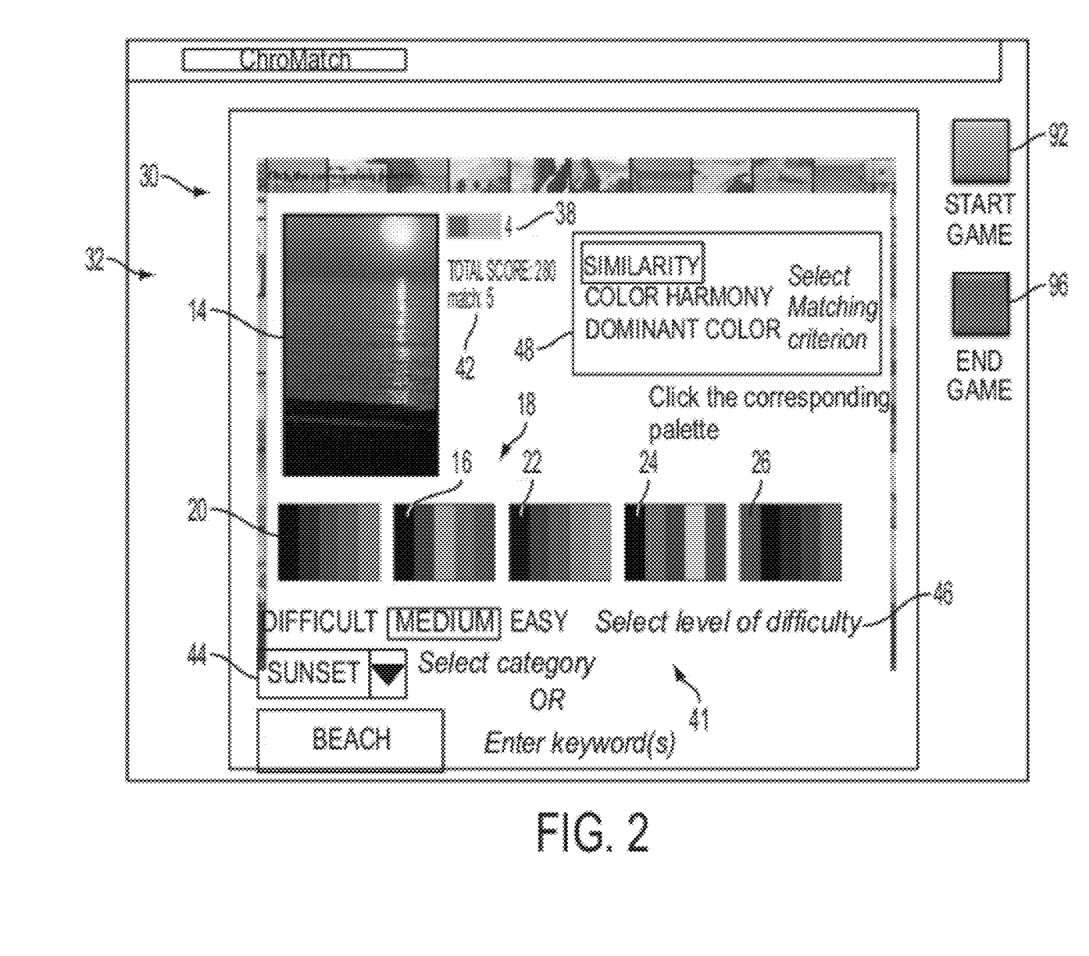
FIG. 2 illustrates a screenshot of a graphical user interface during a chromatic matching game.

With reference also to FIG. 2, which shows an exemplary screenshot, the game can be played using a graphical user interface (GUI) 30 which is displayed on a screen 32 of a user's computing device 34. The user may access the game by utilizing a web browser program 36 resident on or accessible to the user's computing device 34. GUI 30 may be generated by the system 1, alone or in cooperation with software stored on the user's computing device 34, or accessible thereto, when a user selects to play the game. As shown in FIG. 2, the set 18 of candidate predefined color palettes are displayed to the user, in any order, adjacent to the image 14, e.g., in a row. The palettes are selectable through the GUI, e.g., by being associated with a respective actuable area of the screen. Each displayed color palette 20, 22, 24, 26, and 16 includes a row of (e.g., five) colored swatches, which may be arranged in any suitable order, such as the order in which they were arranged by a designer of the color palette.

A timer 38, displayed in the GUI 30, shows the time remaining for the user to identify the correct one of the set 18 of candidate palettes (here, palette 16). The user selects one of the candidate palettes 20, 22, 24, 26, 16 as the match. For example, the user operates a user input device, e.g., a cursor control device 40 (FIG. 1), such as a mouse, joystick, keyboard, keypad, voice activated control device, or the like, to move a cursor 41 displayed on the screen 30 and to click on an active area on or adjacent the selected color palette. The user's score 42, which may be determined based on the amount of time expired before the correct palette 22 is identified, and/or the number of guesses before the correct one is identified, may also be displayed in the GUI 30, as well as selectors 44, 46, 48 for selection of game parameters, such as an image category, level of difficulty, and a matching criterion.

Returning to FIG. 1, the system 1 includes a processor 50, which controls the overall operation of the computer system 1 by execution of processing instructions, which are stored in main memory 52 connected to the processor 50. The exemplary processor 50 also executes instructions 54 stored in memory 52 for performing the method disclosed herein. Computer system 1 also includes a network interface 56 for communicating with databases 10, 12, which may be a stored in a separate non-transitory memory storage device or devices accessible to the system 1. In other embodiments, databases 10, 12 may be resident in data memory 58 of the system 1. As will be appreciated, rather than a single image database 10, the system 1 may have access to multiple image/palette databases, via wired or wireless links, 60, 62, such as the Internet.

The same or a separate network interface 64 provides for communication with the user computer, via a wired or wireless link 66, such as the Internet.

Each of the digital images 14 in the database 10 is annotated with one or more semantic tags 68. The tags(s) may have been applied by submitters of the images 14 and/or may have been automatically applied in an supervised or semi-supervised fashion by an image categorizing system, such as a generic visual classifier (see, for example, the above-mentioned references relating to visual classification methods). The tags may be in any suitable format, such as XML, HTML, or the like, which may be associated with the respective image or stored in a separate file.

In the exemplary embodiment, the system 1 is hosted by a server computer 70 which hosts a service provider's website which is accessible via the user's web browser 36. In other embodiments, all or a portion of the system 1 may be resident on the user's computer 34. The various components 50, 52, 56, 58, 64 of the computer 70 may be all connected by a bus 72.

The computers 34, 70 may each comprise one or more computing devices, such as a PC, such as a desktop, a laptop, or palmtop computer, portable digital assistant (PDA), server computer, cellular telephone, pager, or other computing device capable of executing instructions for performing the exemplary method. As will be appreciated, the user's computer 34 may be similarly configured to the server computer 70, with memory, a processor, a system bus, and in addition, the processor controlling the display 32 to display the GUI, and receiving user inputs, e.g., from the input devices(s) 40.

The memory 52, 58 may be combined or separate and may represent any type of tangible computer readable medium, such as random access memory (RAM), read only memory (ROM), magnetic disk or tape, optical disk, flash memory, holographic memory, or combination thereof. In one embodiment, the memory 52, 58 comprises a combination of random access memory and read only memory. In some embodiments, the processor 50 and memory 52 may be combined in a single chip. The network interface 64 allows the computer 70 to communicate with other devices via a computer network, such as a local area network (LAN) or wide area network (WAN), or the Internet, and may comprise a modulator/demodulator (MODEM). An analogous network interface (not shown) is provided on the user's computer 34.

The digital processor 50 can be variously embodied, such as by a single-core processor, a dual-core processor (or more generally by a multiple-core processor), a digital processor and cooperating math coprocessor, a digital controller, or the like. The digital processor 50, in addition to controlling the operation of the computer 70, executes the instructions 54 stored in memory 52 for performing the method outlined in FIG. 4. An analogous processor and memory (not shown) are provided on the user's computing device 34.

The exemplary instructions 54 are shown in FIG. 1 as including an image retrieval component 80, an image palette extractor 82, a candidate palette retrieval component 84, a palette visualization component 86, a scoring component 88, and a graphical user interface generator 90. As will be appreciated, components 80, 82, 84, 86, 88, 90 may be separate, combined in various combinations, or split, and may be in the form of software stored in hardware, or hardware. The operation of these components is best understood in connection with the exemplary method described below. Briefly, the retrieval component 80 retrieves images 14 from the database 10 for presentation to a user. The retrieved image(s) which may be stored temporarily in memory 58. The image palette extractor 82 extracts an image color palette 16 from the image 14. The candidate palette retrieval component 84 retrieves candidate color palettes 20, 22, 24, 26 from the database 12, e.g., four or five candidate color palettes. In one embodiment, the retrieved palettes are similar to the extracted image color palette 16. The retrieved palettes 20, 22, 24, 26 may be temporarily stored in memory 58. The palette visualization component 86 generates a random visualization of the four or five retrieved palettes 20, 22, 24, 26, and optionally the extracted palette 16, suitable for display to the user. The scoring component 88 generates a score for the game, based on the user's palette selection(s) and/or time expired. The score may be cumulative over a number m of images 14. The scoring component 88, or a separate component, generates the timer 38, which displays the time remaining/elapsed time. The graphical interface generator 90 generates a graphical user interface 30 for display to the user, which integrates the output of the various components 80, 82, 86, 88.

Figure 3:
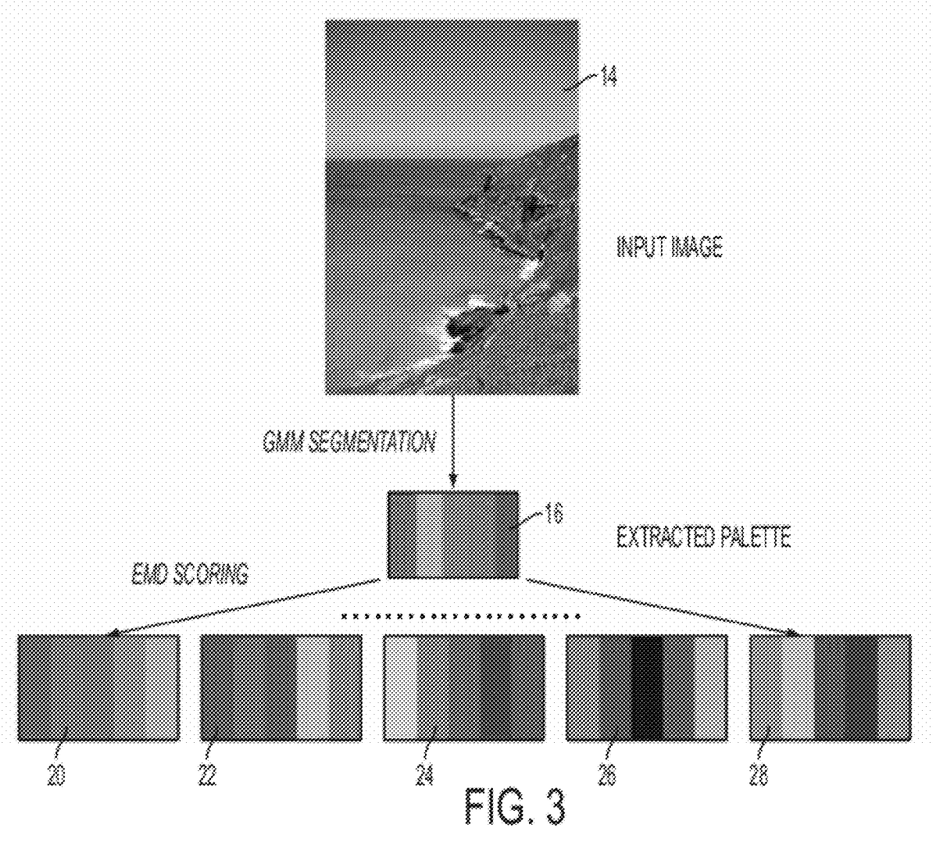
FIG. 3 illustrates a retrieved image, its extracted color palette, and a set of candidate color palettes retrieved from a database.

By way of example, FIG. 3 illustrates an input image 14, a palette 16 containing the dominant colors extracted through GMM segmentation, and similar color palettes 20, 22, 24, 26, 28 retrieved from an existing image database 10 through an Earth Mover Distance.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 4:
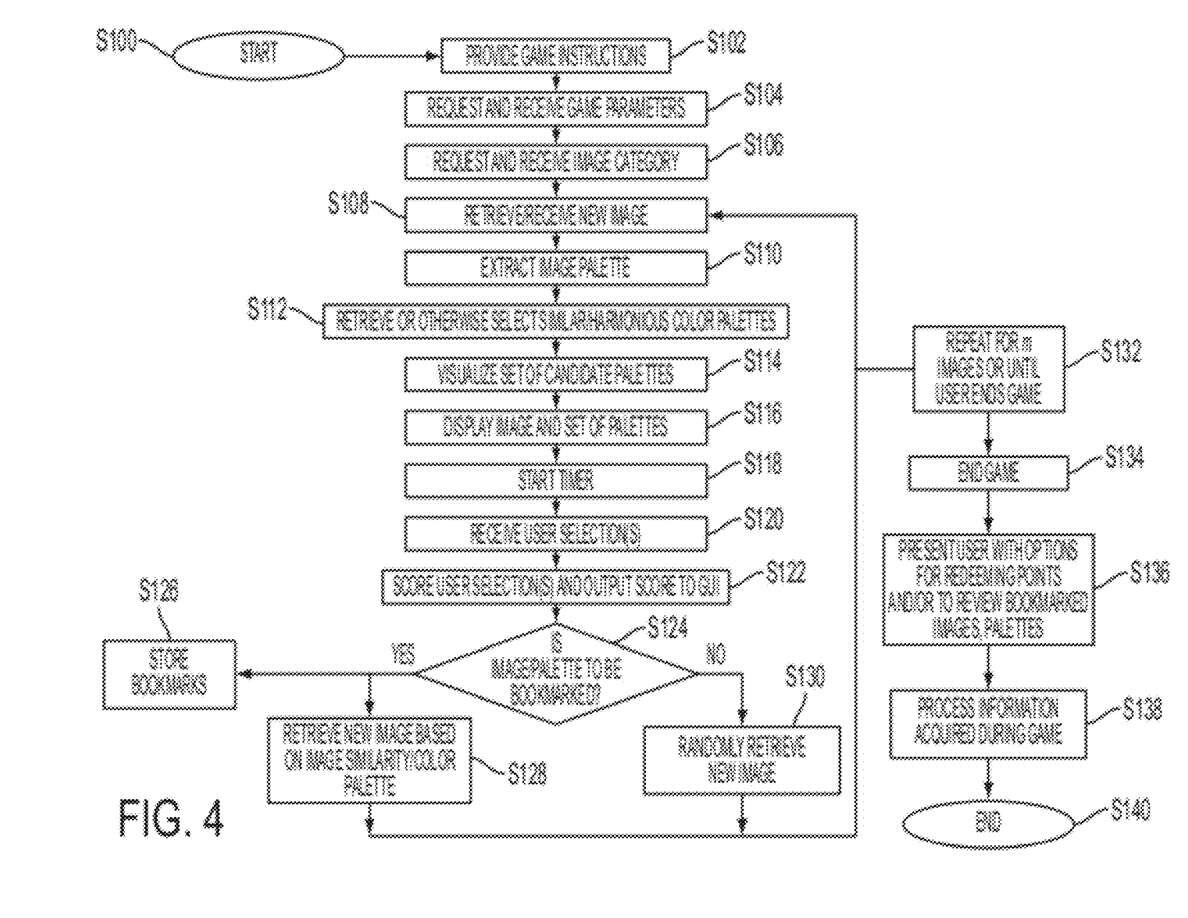
FIG. 4 is a flow diagram illustrating a method for providing a chromatic matching game.

With reference also to FIG. 4, a flow chart illustrating a computer implemented method for playing the game is shown. In the exemplary embodiment, the user's objective is to accumulate points by guessing colors in one or more displayed photographic images 14. It is assumed that the database 10 of images already annotated with semantic tags 68 and the palette database 12 of manually generated color palettes have been created. In one embodiment, for each image in the database, an extracted color palette 16 is precomputed. The game can be played in single mode (against the computer) or with another user in real time. The method begins at S100 and may proceed as follows.

At S102, the user may be provided with instructions for playing the game, such as the selection of an image category, a level of difficulty, and a matching criterion, as well as the time limit for identifying the correct color palette and scoring protocol, rules for playing against another person, and the like.

At S104, game parameters may be requested by the system, e.g., via the user interface, and the user's response is received. For example, the player selects the level of difficulty (e.g., beginner, intermediate, or professional) and matching criterion (e.g., similarity, harmony), if two or more are provided.

At S106, provision is made for a user to select an image category. The user selects the game category (which may cover a broad group of categories) that he or she is interested in, such as "sunset," "flowers," etc. and the system receives the request. The user may click on a start button 92 (FIG. 2), or other user actuable area of the screen, to begin the game.

At S108, an image 14 tagged with the selected category is picked in the database 10 by image retrieval component 80. In a first iteration (first round of the game), the image 14 may be picked randomly from among those tagged with a tag corresponding to the selected category, i.e., without reference to the user's behavior to date.

At S110, a color palette 16 is extracted from the image 14 by the image palette extractor 82, using a segmentation algorithm. For example, given an input image, a palette 16 containing the dominant colors is extracted through GMM segmentation. This step may have been performed previously for all images in the database 10 and the set 94 of extracted palettes 16 stored in memory.

At S112, a group of similar (or harmonious) candidate color palettes, e.g., four or five candidate color palettes, is automatically selected, e.g., by the candidate palette retrieval component 84. Some or all of these may be palettes retrieved from the database 12. As will be appreciated, in a game in which the user has to identify the dominant color, a group of similar, individual colors, rather than palettes, is generated.

At S114, the set 18 of (similar or harmonizing) candidate palettes, optionally including the image palette 16 extracted at S108, is visualized, by the palette visualization component 86, each palette being visualized as a set of color swatches, and at S116, the set 18 is displayed to the user in a randomized order. By random, it is meant that the user does not know at this stage, from the displayed order, which of the set of 18 displayed candidate color palettes is the "correct" palette (e.g., the one most similar to (or harmonious with) the image palette 16, which in the case of similarity, can be the image color palette 16) and which are the "incorrect" palettes (the rest of the candidate color palettes). For example, while the correct palette 16 is shown in the second position in the screenshot shown in FIG. 2, it may, of course, be in any one of the five positions shown.

At S118, a countdown or other timing is started by the scoring component 88, or a separate timer component. The countdown may be started at the same time as the candidate color palettes are displayed. This displays a limited, fixed timer for the user to identify the correct palette At S120, the user attempts to identify the correct palette by selecting one or more candidate color palettes and the selection(s) is/are received by the scoring component 88. The user may be permitted to select more than one palette and may continue to make selections, in turn, until the correct palette is found or the countdown ends. As an example, in the GUI 30 of FIG. 2, the user selects a color palette among the five candidate palettes 20, 22, 24, 26, and 16, based on the perceived dominant colors of the input image 14. The user has a time limit, for example of 10 seconds, to find the correct palette. When the user selects the correct palette, the timer stops, if the allotted time has not already expired, and the elapsed time (or time remaining) is stored in memory 58.

At S122, the user's score 42 is computed by the scoring component 88, based on the time taken to identify the correct candidate palette and/or the number of incorrect palettes selected before the correct one is identified. In one embodiment, the system awards the user an amount of points. This may be inversely proportional to the time spent before finding the correct palette and the number of incorrect palettes that have been selected. If the user does not identify the correct palette in the allotted time, a default score may be accorded, such as 0.

At S124, the user may be provided with the opportunity to bookmark the image 14 and/or a color palette. For example, once the selection process is ended, information is displayed in the GUI which prompts the user to click on the image if it is to be bookmarked and/or to click on one or more of the palettes to be bookmarked. The user can then bookmark the image and/or one of the presented palettes 20, 22, 24, 26, 16, and at S126, the bookmarks (e.g., a reference to the image or palette or the image or palette itself) are stored for later retrieval by the user, e.g., in memory 88.

For the next round, the system 1 picks another image 14 using the following criteria:

If the user bookmarked the displayed image 14 in the previous round of the game, an image with semantic content similar to that of the bookmarked image is picked at S128 (e.g., one with the same or similar word(s) in the tag).

If the user bookmarked a color palette in the previous round, then an image with a similar color palette is picked at S128 (e.g., based on a distance metric).

If the user did not bookmark anything in the prior round, a random image may be retrieved from database 10 at S130 (as for S108).

At S132, the method returns to S108, where the method is repeated for m rounds, or until the user decides to stop.

At S134, after m iterations, or if the user decides to end the game, the game ends. For example, if the user decides to end the game, the user may click on a game end button 96 (FIG. 2), or other user actuable area of the screen, to end the game.

At S136, the user may be presented with options for redeeming the accumulated points, e.g., on printing services, via the GUI. For example, instructions may be displayed for selecting one or more services offered by the web service provider. The user may also be presented with options for reviewing the bookmarked images 14 and/or bookmarked color palettes. Where the user bookmarked both an image and a color palette in a round, these may be displayed together. Provision may be made for the user to import one or more bookmarked image(s) 14 and/or bookmarked color palette(s) into his or her creative workflow, for example, to paste the image into a document and/or color non-image portions of the document, such as text and/or background areas, with colors selected from the color palette.

At S138, information collected during the game, such as incorrect color palettes selected and/or palettes/images bookmarked, may be stored in memory 58 and processed. The method ends at S140.

The method illustrated in FIG. 4 may be implemented in a computer program product that may be executed on a computer. The computer program product may comprise a non-transitory, tangible computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 4, can be used to implement the exemplary method.

Further details of the system and method are now provided.

Image Category Selection/Identification (S106)

Various ways are considered for identifying a compliant image or images based on a user's category selection. The images 14 in the image database 10 may each have been manually annotated with one or more tags 68 in the same natural language, e.g., English, or in different natural languages. Each tag 68 may be a single word or more than one word, such as "red sky" or "sunset." In one embodiment, a set of categories, such as category tags or generic category descriptions covering a group of category tags, is displayed to a user, e.g., in a "cloud." A user can click on one of the categories. Alternatively, a user may select from a list of categories, e.g., via a drop down menu, and/or by typing all or part of a category in a manual entry box, optionally with autocompletion options suggested by the system 1, based on the existing tags in the database 10 or on a predefined set of categories, which may be grouped hierarchically. The user may type in or select a single keyword or may be permitted to enter/select more than one keyword (such as "beach AND sky" or "beach OR sky").

In some embodiments, the system, or a suitable search engine associated therewith, may identify tags 68 which include a word or words that are similar or identical to one or more of the keywords entered or otherwise selected by the user, e.g., by using a thesaurus, root form identifier, or the like for expanding the search. In other embodiments, a similarity (e.g., edit distance) is computed between the query word(s) and the word(s) of the tags to identify the most similar tags. The keywords/tags may be translated into other languages before querying the database 10 if these are likely to be present in the tags/keywords. Thus, for example, the keyword (s) "sundown" or "cielo rosso" may both retrieve images which are tagged with "sunset."

In one embodiment, the system may be configured to retrieve a pool of the n (e.g., n=20) images having tags most similar to the input keyword and from the pool, randomly select an image. Once an image has been displayed in a game, it is removed from the pool. In this way, the system avoids displaying the same image twice to a user in a game.

In some embodiments, the categories displayed in the game may be influenced by a user's prior image retrieval behavior, e.g., restricted to a set of categories that the user has been recently using for image retrieval and/or categories closely related thereto.

Image Palette Extraction (S110)

A color palette 16 composed by a variable number of color swatches (typically five) is extracted based on the selected image 14, using a suitable segmentation algorithm. In the exemplary embodiment, a GMM composed by five three-dimensional Gaussians (Gaussian functions) is fitted to the image in a suitable, coherent three dimensional color space, such as the R,G,B or L*a*b color space (more generally, a predetermined number n of m-dimensional Gaussians is fitted in a color space with m dimensions to produce an extracted color palette with n color swatches). The means of the five Gaussians are then taken as the representative colors of the image. In this method, the R,G,B values, for example, of each pixel in the image are first identified. A generative model is then trained to estimate the parameters of five Gaussians (Gaussian functions) which, in a weighted combination, best fit the data. The parameters of the Gaussians to be estimated are the respective mean (R,G,B color), the covariance, and a mixture weight. To identify the Gaussians' parameters, an Expectation Maximization (EM) algorithm may be used which alternates between performing an expectation (E) step and a maximization (M) step. The M-step computes parameters maximizing an expected log-likelihood function generated on the E-step. These parameter-estimates are then used to determine the distribution of the latent variables in the next E-step. The EM algorithm may be iterated for a fixed number of times, such as two, three, or four times or may be iterated until convergence, e.g., the parameters vary by less than a threshold amount between iterations. Such an iterative maximization algorithm that terminates at a stopping criterion before an absolute maximum is reached is nonetheless considered to optimize or best fit the data. It is also contemplated for the optimum value to be a local optimum value.

The computation of the GMM may be a follows: parameters of the GMM are denoted by $\lambda=\{w_i,\mu_i,\Sigma_i, i=1\ldots n\}$ where $w_i$, $\mu_i$, and $\Sigma_i$ are respectively the weight, mean vector and covariance matrix of Gaussian i, and n denotes the number of Gaussian components (here n=5). If x denotes an observation (here, a vector with three values representing the color of a pixel in the image) and q denotes which Gaussian emitted x, then the likelihood that x was generated by the GMM is:

$$p(x|\lambda)=\Sigma_{i=1}^n w_i p_i(x|\lambda), \quad (1)$$

where $p_i(x|\lambda)=p(x|q=i,\lambda)$.

The weights are subject to the constraint: $\Sigma_{i=1}^n w_i=1$. The components $p_i$ are given by:

$$p_i(x_t|\lambda) = \frac{\exp\left\{-\frac{1}{2}(x_t-\mu_i)'\sum_i^{-1}(x_t-\mu_i)\right\}}{(2\pi)^{D/2}|\Sigma_i|^{\frac{1}{2}}}, \quad (2)$$

where |.| denotes the determinant operator and D denotes the dimensionality of the feature space (here D=3, if the observations have 3 dimensions, such as RGB or Lab color values).

Let $X=\{x_t, t=1\ldots T\}$ denote the set of input image pixels. The parameters of the GMM can be obtained by maximizing the log-likelihood function $\log p(X|\lambda)$, through Maximum Likelihood Estimation (MLE), which involves one or more iterations of an expectation (E) step and a maximization (M) step, e.g., until the results approach convergence or for a predetermined number of iterations. In the expectation (E) step, the posterior occupancy probabilities are computed based on the current estimates of the parameters. The occupancy probability, which is the probability that observation $x_t$ has been generated by Gaussian i, is $\gamma_i(x_t)=p(q_t=i|x_t,\lambda)$. This probability is computed as:

$$\gamma_i(x_t) = \frac{w_i p_i(x_t|\lambda)}{\sum_{j=1}^n w_j p_j(x_t|\lambda)}.$$

In the maximization (M) step, the where the parameters are updated based on the expected complete-data log-likelihood given the occupancy probabilities computed in the E-step:

$$\hat{w}_i = \frac{1}{T}\sum_{t=1}^T \gamma_i(x_t),$$

$$\hat{\mu}_i = \frac{\sum_{t=1}^T \gamma_i(x_t) x_t}{\sum_{t=1}^T \gamma_i(x_t)},$$

$$\hat{\Sigma}_i = \frac{\sum_{t=1}^T \gamma_i(x_t) x_t x_t'}{\sum_{t=1}^T \gamma_i(x_t)} - \hat{\mu}_i \hat{\mu}_i'.$$

For further details on the EM algorithm, see, for example, Dempster, et al., "Maximum likelihood from incomplete data via the EM algorithm", Journal of the Royal Statistical Society Series B, vol. 39 no. 1, pp. 1-38 (1977).

The output of S110 is the mean (R, G, and B color values) of each of the five Gaussians and a corresponding mixture weight. The means are stored as the colors of the extracted palette 16. The mixture weights, which sum to 1, can be used to give a relative importance to the respective swatches in the color palette retrieval step (S112).

Several other clustering methods (e.g. K-means, Binary trees, etc.), which have been used previously for image quantization, can alternatively be employed to extract the dominant colors of an image. See, for example, M. T. Orchard and C. A. Bouman, "Color quantization of images," IEEE Transactions on Signal Processing 39, pp. 2677-2690 (1991). In practice, however, the exemplary GMM approach provides a good representation of the perceived dominant colors.

Selection Of Candidate Colors/Palettes (S112)

While in the exemplary embodiment, the set 18 of candidate color palettes presented to the user includes the extracted image palette 16, in other embodiments, the set 18 of candidate palettes excludes the image color palette 16. In this embodiment, the system identifies one of the candidate predefined color palettes, e.g., palette 22, as the being the correct match, based on its computed similarity with the extracted color palette 16.

In the exemplary embodiment, at least some of the candidate palettes are retrieved from the palette database 12, based on a similarity measure. To compare palettes formed by multiple color swatches, a naïve approach based on the distance of each singular color swatch in the palette 16 from its closest swatch in a database could be used. Alternatively, one of the many methods developed within the image retrieval community can be used (see Datta 2008). Visual similarity between individual colors in the extracted image palette 16 and those of palettes in the database 12 can be computed using a distance metric, such as L1, cos-L1, L2, weighted L2 distance in some perceptually coherent color space such as CIE L*a*b* or CIE Luv.

In the exemplary embodiment, however, to identify a set of similar palettes, an overall distance measure such as the Earth Movers Distance (EMD) is used to compute the distance between the set of colors of the image palette 16 computed at S110 and the color palettes stored in the database 12. EMD is used to compute the distance between two distributions, which are represented by signatures. In the present case, the signature is composed by the concatenation of the colors of all the color swatches in the image color palette 16 and optionally a respective weight. The colors may have been converted into a suitable color space, such as the L*a*b* space. In an exemplary embodiment, the colors are given different weights, the weights representing a relative importance of the dominant colors in the image 14. The weights can be their Gaussian mixture weights. Thus, in the signature of the image palette 16, each swatch can be represented by four elements (L* a* and b* values and mixture weight) of a twenty element vector (in the case of five swatches). Alternatively, the colors the image color palette 16 can all be given the same weight.

In one embodiment, a constant weighting scheme is adopted for the signatures of the predefined color palettes in database 12. These palettes are expressed in the same color space as the extracted palette, e.g., L*a*b*. Thus, each color of a predefined color palette is given the same weight (0.2 in the case of five swatches). The signatures of the predefined color palettes in the database 12 may be the same length as that of the image palette, or, where the predefined color palettes include different numbers of swatches, they may have different signature lengths. The signatures of all the color palettes in database 12 may be stored, e.g., in database 12 or in memory 58.

The EMD is defined as the minimum amount of work needed to change one signature into the other. The notion of "work" is based on a user-defined ground distance which is the distance between two features, here the Euclidean distance between colors in the Lab color space. In one embodiment, the EMD may be computed according to the Matlab algorithm available at www.mathworks.com/matlabcentral/fileexchange/12936-emd-earth-movers-distance-mex-interface, although other methods for computing the EMD exist, which may be used herein.

Further details on the EMD method are to be found in Y. Rubner, C. Tomasi, and L. J. Guibas, "A Metric for Distributions with Applications to Image Databases," in Proc. 1998 IEEE Intern'l Conf. on Computer Vision, Bombay, India, January 1998, pp. 59-66.

Other approaches, based on Fisher Kernel, Bag of Colors, Manhattan distance (L1), Euclidian distance (L2), dot product, Bhattacharyya distance, Kullback-Leibler divergence (symmetrized or not), Jensen-Shannon divergence or the chi$^2$ distance, and the like may be used for identifying similar predefined color palettes in the database 12.

In preliminary palettes retrieval experiments, however, the EMD distance was found to outperform other distance approaches tested (e.g., L1, cos-L1, L2, weighted L2, etc.), e.g., as measured in terms of mean Average Precision (mAP). EMD also allows the comparison of palettes of different sizes (different numbers of color swatches).

In some embodiments, one or more of the candidate color palettes in the set 18 may be generated automatically, e.g., by identifying a set of colors which is close to, but not visually identical to, the image color palette 16 (e.g., each color (or at least one color) of the candidate palette differs from its corresponding color in the image palette by a ΔE* of at least 1.0 or at least 2.0 in the CIE76 L*a*b* difference method). These candidate color palettes can be considered noise palettes which can be used to make the game more or less difficult, depending on how far the colors differ from those of the image color palette 16 and how many noise palettes are used.

In some embodiments, noise palettes may include colors which are in the image 14 but which are not among the (five) predominant colors. In some embodiments, noise palettes can be palettes which are drawn randomly from the palettes database 12. In other embodiments, predefined color palettes which differ from the image palette 16 by at least a minimum EMD are selected as noise palettes. In some embodiments, the noise palettes may be artificially generated, or manually generated. They may be stored in database 12 and/or a separate database.

In the case of a game for identifying color harmony, the system 1 identifies a set 18 of candidate color palettes, at least one having colors which harmonize with the image. In one embodiment, this is achieved by applying rules for identifying the hue values of the colors in the image palette 16 in a color space which uses hue as one of its coordinates, such as HSV. For each color in the image palette, a complementary color is identified. In one embodiment this is a color with an opposite hue on the 360° HSV color wheel, i.e., separated by 180° (or approximately)180°. Thus, for example, blue is opposite to yellow and red is opposite to a blue-green color. In general, complementary colors are those which, when mixed, produce a neutral color (grey or white). The complementary colors selected may have the same saturation and brightness as those in palette 16, or different values. The set of complementary colors thus identified forms a correct (harmonious) palette in the set 18 of candidate palettes. Other palettes in the set 18 can be produced as for the noise palettes described above, and/or by identifying color palettes in database 12 that are similar to the correct palette. In another embodiment, complementary colors to non-dominant colors in the image are identified for the incorrect palette or palettes. As will be appreciated, in the case of a game based on identifying harmonious palettes, the database 12 is not needed.

In the case of a dominant color game, the object is to identify the most dominant color in the image from a set of colors. In this embodiment, a single Gaussian may be fitted to the image data of image 14 and its mean taken as the dominant color. Or, the color which has the highest mixture weight in a Gaussian mixture model of, for example 5 GMMS, can be selected. This color, along with other similar colors, may be displayed to the user. The incorrect colors can be non-dominant colors, or colors similar to these.

Palettes Visualization And Scoring (S114-S122)

The image color palette 16 and the retrieved color palettes 20, 22, 24, 26 are randomized and visualized along with the image 14. In the exemplary embodiment, the user can select multiple palettes until he or she finds the correct palette. At that time, a score s(t,n_p) can be calculated with a suitable equation which takes into account elapsed time t and number of palettes n_p chosen before guessing the correct one. In one embodiment, the score is calculated using the equation:

$$s(t,n\_p) = \alpha/t, \text{ with } \alpha = (1+n\_p/x)^{-1}$$

where x is, for example, greater than 1, such as at least 5, e.g., 10, and t is in seconds (in the exemplary embodiment, from 1-10 seconds). For example, the maximum number of seconds allowed for identifying the correct palette. The score can be normalized to an integer value between, for example, 1 and 10, which is cumulated with scores of other rounds and optionally with other games played by the same player.

Image Retrieval (S128, S130)

Once a round terminates, e.g., with the choice of the correct palette, another image needs to be picked for the next round. This step can be used to steer the exploration of the databases 10, 12 towards the types of images/palettes in which the user appears to be interested, using the user preference information gleaned at S124 as relevance-feedback information. The preference for a specific type of image can be expressed through one or more of: the previously bookmarked image(s), bookmarked color palette(s), and/or verbal comments input by the user. The latter can be captured with appropriate software/hardware and processed to identify image attributes, which may be roughly categorized as to whether the image is suitable/not suited for the user's needs. In preliminary tests performed with few game players, the users made observations and remarks for almost every image regarding the aesthetic quality of the image without being told to do so.

If bookmarked images 14 are available, the most straightforward solution is to retrieve the most similar image among the ones in the database 10 according to specific criteria. If a color palette is bookmarked, retrieval can be performed using palette signatures using EMD or using color descriptors (See for example Deng, Y., Manjunath, B. S., Kenney, C., Moore, M. S., And Shin, H., "An efficient color representation for image retrieval," IEEE Trans. Image Process. 10, 1, 140-147 (2001); and above-mentioned U.S. Pub. No. 20080046410). Thus, for example, a set of palettes 94 is extracted from all (or at least some of) the images 14 in the database 10 and may be stored in memory, such as memory 58, prior to the start of a game. The bookmarked palette is then compared to the set 94 of palettes and an image 14 with a similar palette is retrieved for the next round.

If no explicit preference is expressed, the system may pick the next image at random (S130) or may return to a prior bookmarked image or palette and select a new image based on that.

For retrieval of a similar image based on a bookmarked image, this may be done based on semantic content of the image, and/or on words of its tag 68. For content-based retrieval, a variety of methods exist for characterizing the image 14 by its image signature. The image signature is based on features extracted from the image. For a description of such methods, see for example, the above-mentioned references relating generally to visual classification and image retrieval methods, incorporated herein by reference. Briefly, these methods rely on extracting low level features from small patches of the image. From the low level features, a representation of the image (image signature) in terms of a set of statistics (high level features) is generated.

Two methods of generating global (high level) features are considered by way of example: 1) a bag-of-visual word (BoV) approach, which includes generation of a soft occurrence histogram; and 2) a Fisher kernel representation. However, it is to be appreciated that other, similar methods of aggregating local features into global features are contemplated.

In the exemplary BoV and Fisher Kernel approaches, low level features are extracted by dense sampling, although other methods may be used. In particular, patches of the image may be obtained on the predefined grid, optionally at multiple scales. Random methods of extracting patches or extraction at salient points are also contemplated. The low level features which are extracted from the patches are typically quantitative values that summarize or characterize aspects of the respective patch, such as spatial frequency content, an average intensity, color characteristics (in the case of color images), gradient values, Scale Invariant Feature Transform (SIFT) descriptors, and/or other characteristic values. For example, two different image features: a histogram of edge orientations, which describes texture, and the local mean and variances in RGB to describe color, may be used. In both cases, the low level features may be extracted at dense grids for each scale considered.

The bag-of-visual word (BoV) approach is described, for example, in U.S. Pub. Nos. 20070005356 and 20070258648. In the BoV approach, the high level features generation step may include accessing a pretrained model with the extracted low level features. The model may have been trained with patches extracted from a large set of training images. The training images may include images similar in content to those expected to be processed. The low level features extracted from the training image patches are clustered to form a set of visual words. The model is then used to assign a visual word to the low level feature set of a new image patch, based on its similarity to the extracted features of the training patches associated with that word. Or, more generally, the patch is assigned a probability for each of the visual words the model has been trained to recognize, which can be concatenated to form a features vector. The visual vocabulary can be modeled as a Gaussian mixture model (GMM) where each Gaussian (function) corresponds to a visual word. In a visual vocabulary framework, the means of the GMMs represent the visual words. A low level descriptor of a patch (such as a vector comprising the extracted low level features) is fed to the pretrained model, which outputs a GMM which is representative of the patch. The image signature can thus be a vector which is a concatenation of the GMMs for each of the patches.

The Fisher kernel (FK) representation is described, for example, in above-mentioned U.S. Pub. No. 20070258648 and in F Perronnin and C. Dance, "Fisher kernels on visual vocabularies for image categorization." Briefly, the FK method uses gradient vectors to describe in which direction the parameters of a generic model should be modified to best fit the data. As for the BoV method, a GMM can be used as the generative model of the high level features. The means of the GMM represent the visual words. The resulting vector generated by the BoV or FK method can be normalized to form the image signature.

As will be appreciated, image signatures 98 for all or at least some of the images 14 in the database 10 may be pre-computed before the start of a game and stored in memory, such as memory 58 (FIG. 1).

The image signature of the image 14 is compared with the signatures of other images in the database 10. The similarity of two images can thus be defined as a distance between their image signatures. Several suitable measures of similarity/distance between histograms including the dot product, the $chi^2$ distance, the Kullback-Leibler (KL) divergence, the Jensen-Shannon divergence, and the like may be used in computing similarity in the BOV method. In the case of FK, measures such as the Euclidian distance, the Manhattan distance, or the cosine similarity may be used in computing similarity between image signatures.

For example, the image retrieval component 80 of the system retrieves images 14 whose image signatures equal or exceed a threshold of similarity with the image signature of the current image and randomly selects one of these images for presentation to the user. Alternatively, the top k (e.g., ten) images 14 (or any other selected number) with the highest similarity measure may be retrieved and one of these drawn at random. In other embodiments, only a single image is retrieved, which has the highest similarly score.

As will be appreciated, in the general case, more than similarity scores may be generated for an image (e.g., content-based and tag-based), in which case, more than two rankings may be aggregated.

The retrieved image 14, however it is selected, then becomes the next image to be presented to a user in the next round at S116, e.g., on the display 32.

Collection Of Data (S138)

As will be appreciated, the system 1 may collect and store information at the end of each round or when the game is finished. For example, at the end of each round of the game, the ground truth palette 16 extracted from the presented image 14 and the sequence of candidate palettes selected by the user can be stored in memory 58.

When the user makes "mistakes" by selecting the wrong matching palette he implicitly states that the selected palette is very relevant to describe the colors of the input image. For this reason, erroneous candidate palettes can be used to generate a dataset useful to test similarity measures between color palettes. These incorrect palettes can later be presented to a user who is seeking color palettes to complement an image.

Without intending to limit the scope of the exemplary embodiment, the following example illustrates one application of the exemplary system and method.

EXAMPLE

The Chromatch game was implemented in a simulated web-based application within an existing system of image retrieval (as described in U.S. patent application Ser. No. 12/693,795). This system is designed for assisting a user in navigation of an image dataset. Images are retrieved from the dataset in response to user's text query. The images are displayed in a two dimensional array, ordered according to features selected by a user, such as an emotional and/or aesthetic features.

As will be appreciated, the present system and method may be used in tandem with such a system, to alleviate boredom. The user may, at any time, decide to play the game, or it may be suggested to the user, e.g., via a pop-up message in GUI 30, after some time has elapsed.

In the game, the user is asked to select a theme (e.g., beach) by clicking on a tag in a tag-cloud. The user then clicks on the start button 92 to start the game. The game continues automatically until the user decides to stop.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for image retrieval formulated as a game comprising:
   a) receiving a user's image category selection;
   b) retrieving an image responsive to the user's image category selection from an associated image database;
   c) providing for displaying the retrieved image and a set of candidate color palettes to the user, the set of candidate color palettes including a correct palette and at least one incorrect palette;
   d) providing for a user to attempt to identify the correct palette by selecting at least one of the displayed candidate color palettes;
   e) providing for a user to bookmark at least one of:
      the displayed image; and
      at least one of the displayed candidate color palettes, and
      when the user bookmarks the displayed image, retrieving a next image similar to the bookmarked displayed image, including comparing an image signature of the displayed image with image signatures of images in the database and retrieving an image having an image signature which is similar to the signature of the displayed image, and
      when the user bookmarks a displayed color palette, retrieving a next image having a color palette which is similar to the bookmarked displayed color palette;
   f) with a computer processor, generating a score based on the user's at least one selection and outputting the score; and
   g) repeating c), and d) wherein the retrieved image is the next image.

2. A system for image retrieval formulated as a game comprising:
   an image retrieval component for retrieving an image from an associated image database;
   a palette extractor which extracts a color palette from the retrieved image;
   a candidate palette retrieval component for retrieving predefined color palettes from an associated color palette database based on a comparison with the extracted color palette;
   a visualization component for visualizing a set of candidate color palettes for display on a user's graphical user interface in association with the retrieved image, the set of candidate color palettes including the extracted color palette and at least one of the retrieved predefined color palettes;
   a scoring component for scoring a user's selection of at least one of the displayed set of candidate color palettes, whereby a score is displayable on the user's graphical user interface; and
   a processor which implements the image retrieval component, the palette extractor, the candidate palette retrieval component, the visualization component, and the scoring component.

3. The system of claim 2, wherein the system is a web-based system.

4. A method comprising:
   retrieving an image from an associated image database;
   extracting a color palette from the retrieved image;
   with a computer processor, retrieving predefined color palettes from an associated color palette database based on a comparison with the extracted color palette;
   visualizing a set of candidate color palettes for display on a user's graphical user interface in association with the retrieved image, the set of candidate color palettes including the extracted color palette and at least one of the retrieved predefined color palettes;
   scoring a user's selection of at least one of the displayed set of candidate color palettes, whereby a score is displayable on the user's graphical user interface;
   providing for the user to bookmark at least one of the displayed image and one of the candidate color palettes in the set of color palettes; and
   wherein the retrieval of the image is retrieved based on at least one of:
      an image category selected by the user;
      a different image bookmarked in a prior round in which the different image and an associated set of candidate color palettes was displayed to the user; and
      a color palette bookmarked in the prior round.

5. A method for image retrieval formulated as a game comprising:
   a) receiving a user's image category selection;
   b) retrieving an image responsive to the user's image category selection from an associated image database;
   c) providing for displaying the retrieved image and a set of candidate color palettes to the user, the set of candidate color palettes including a correct palette and at least one incorrect palette;
   d) providing for a user to attempt to identify the correct palette by selecting at least one of the displayed candidate color palettes;

e) providing for a user to bookmark at least one of:
  the displayed image; and
  at least one of the displayed candidate color palettes, and
    when the user bookmarks the displayed image, retrieving a next image similar to the bookmarked displayed image, and
    when the user bookmarks a displayed color palette, retrieving a next image having a color palette which is similar to the bookmarked displayed color palette, including comparing the color palette with color palettes extracted from the images in the database and retrieving an image having an extracted color palette which is similar to the bookmarked color palette;
f) with a computer processor, generating a score based on the user's at least one selection and outputting the score; and
g) repeating c), and d) wherein the retrieved image is the next image.

6. The method of claim 1, wherein the retrieving of the image responsive to the user's image category selection comprises receiving an image which is tagged with a tag which matches a user's selected category.

7. The method of claim 1, wherein each of the candidate color palettes in the set includes a plurality of color swatches.

8. The method of claim 1, wherein each of the candidate color palettes in the set includes at least three color swatches.

9. A method for image retrieval formulated as a game comprising:
  receiving a user's image category selection;
  retrieving an image responsive to the user's image category selection from an associated image database;
  extracting a color palette from the retrieved image;
  comparing the extracted color palette with a set of stored predefined color palettes;
  retrieving a subset of the stored predefined color palettes based on the comparison;
  providing for displaying the retrieved image and a set of candidate color palettes to the user, the set of candidate color palettes comprising the extracted color palette as a correct color palette and at least some of the color palettes in the subset as incorrect color palettes;
  providing for a user to attempt to identify the correct palette by selecting at least one of the displayed candidate color palettes; and
  with a computer processor, generating a score based on the user's at least one selection and outputting the score.

10. The method of claim 9, wherein the comparing comprises computing a distance metric which takes into account each of the colors in the extracted color palette.

11. The method of claim 10, wherein the computing of the distance metric comprises computing an earth mover's distance.

12. The method of claim 1, wherein the set of candidate color palettes includes at least one color palette retrieved from a database of predefined color palettes.

13. The method of claim 1, wherein the set of candidate color palettes includes at least one color palette extracted from the image, the extracted palette being the correct palette.

14. The method of claim 13, wherein the extracted color palette comprises no more than ten colors.

15. The method of claim 1, wherein for each of the set of candidate color palettes, each color in the color palette is displayed as a swatch.

16. The method of claim 1, wherein the user is allowed a fixed time to identify the correct palette.

17. The method of claim 1, wherein the generating of the score is based on at least one of a number of incorrect palettes selected by the user before the correct palette is selected and a time taken to select the correct palette.

18. The method of claim 1, wherein the score is cumulated over a plurality of retrieved images and corresponding sets of candidate color palettes.

19. The method of claim 18, further comprising, providing for the user to redeem points based on the accumulated score for an item or service of value.

20. The method of claim 1, further comprising providing for the user to select from a plurality of games, including:
  a first game in which the correct palette is a color palette which is computed to be a most similar one of the candidate color palettes, based on the color palette extracted from the displayed image, or which is the color palette extracted from the displayed image; and
  a second game in which the correct palette is a color palette which is computed to be a most harmonious one of the candidate palettes, based on the color palette extracted from the displayed image.

21. A computer program product comprising a non-transitory recording medium encoding instructions, which when executed on a computer, causes the computer to perform the method of claim 1.

22. A system for performing the method of claim 1 comprising memory which stores instructions for performing the method and a processor in communication with the memory, for executing the instructions.

23. The method of claim 9, further comprising:
  providing for a user to bookmark at least one of:
    the displayed image; and
    at least one of the displayed candidate color palettes.

24. The method of claim 23, further comprising:
  when the user bookmarks the displayed image, retrieving a next image similar to the bookmarked displayed image and when the user bookmarks a displayed color palette, retrieving a next image having a color palette which is similar to the bookmarked displayed color palette
  repeating the displaying and providing for the user to attempt to identify the correct palette, wherein the retrieved image is the next image.

25. The method of claim 24, wherein when the user bookmarks the displayed image, the retrieving a next image includes comparing an image signature of the displayed image with image signatures of images in the database and retrieving an image having an image signature which is similar to the signature of the displayed image.

26. The method of claim 9, wherein the generating of the score is based on at least one of a number of incorrect palettes selected by the user before the correct palette is selected and a time taken to select the correct palette.

* * * * *